United States Patent [19]

Beals

[11] Patent Number: 4,921,266

[45] Date of Patent: May 1, 1990

[54] FIFTH WHEEL HAMMER BALL FOR GOOSENECK TRAILERS

[76] Inventor: Ralph Beals, Rte. 6, Box 49, Truck Rte. 7T, Russellville, Ark. 72801

[21] Appl. No.: 306,768

[22] Filed: Feb. 6, 1989

[51] Int. Cl.$^5$ .............................................. B60D 1/00
[52] U.S. Cl. ........................... 280/415.1; 280/416.1; 280/417.1; 280/418.1; 280/423.1; 280/433; 280/495; 280/901
[58] Field of Search ...................... 280/433, 407, 415.1, 280/416.1, 423.1, 477, 491.3, 901, 511, 504, 418.1, 417.1, 418.1, 495

[56] References Cited

U.S. PATENT DOCUMENTS

| | | | |
|---|---|---|---|
| 1,986,149 | 1/1935 | Harris | 280/433 |
| 4,176,853 | 12/1979 | Brock | 280/423.1 |
| 4,183,548 | 1/1980 | Schneckloth | 280/433 |

Primary Examiner—Mitchell J. Hill
Attorney, Agent, or Firm—Stephen D. Carver

[57] ABSTRACT

A fifth wheel gooseneck trailer ball coupling system for user mounting to pickup trucks comprises a multi-piece stress distributing frame and a hammer actuated ball coupling which enables the user to deploy the system in towing or non-towing modes with the use of a simple hammer. The three piece frame comprises a first generally rectangular, bed plate adapted to be disposed upon the bed of the pickup truck and bolted to the chassis, a second, back-up plate of a generally rectangular or square configuration, which is carefully welded at the front center of the bed plate, and a third frame plate, in the form of an annular apertured hammer ball base plate welded to the back-up plate. The hammer ball base plate comprises a rigid steel, annular disk comprising a central threaded orifice which receives the ball coupling. The ball coupling comprises a rigid spherical ball integral with a base portion and a downwardly projecting threaded shaft. A hammer flange welded to the base comprises a generally circular central segment and a pair of integral outwardly projecting ears which may be appropriate pounded by a simple hammer to firmly install or uninstall the ball.

13 Claims, 2 Drawing Sheets

FIFTH WHEEL HAMMER BALL FOR GOOSENECK TRAILERS

BACKGROUND OF THE INVENTION

The present invention relates generally to ball type trailer hitches. More particularly, the present invention relates to a quick release ball hitch system particularly adapted for gooseneck trailers.

Ball and socket trailer hitch coupling assemblies have long been known in the prior art. Typical devices comprise a rigid, ball-like coupling element comprising a sphere integrally associated with a lower diverging base. The base is usually coupled to a supporting member such as a portion of a truck bumper or the like. Usually the ball includes a shaft member which extends downwardly through the planar mounting member for retention by a suitable nut. As will be recognized by those skilled in the art, a typical trailer includes an appropriately configured tongue, including a socket which mates to the ball connector.

A representative ball hitch connector is seen in U.S. Pat. No. 4,596,406 issued June 24, 1986. The latter reference discloses a hitch connector system wherein the ball diameter can be quickly adjusted to accommodate trailer couplings of different sizes. The latter reference discloses the wealth of prior art ball and socket patents, and discusses some of the problems with conventional ball and socket couplings.

It will also be well recognized by those skilled in the art that "gooseneck" trailers have relatively recently become popular. Such trailers enable the user to tow rather heavy loads much more safely and efficiently by coupling to the tow vehicle at a point near its wheeled rear axle. Gooseneck trailers include a generally C-shaped member which projects outwardly from the trailer and terminates in an appropriate socket coupling for connection to the hitch ball. It is known to mount the ball to the bed of a typical pickup truck to apply weight to the tow vehicle substantially over its rear wheeled axle. In addition, when gooseneck trailers are so coupled to the tow vehicle, the turning radius is decreased, since the trailer pivots from a point well to the front of the traditional bumper mounted trailer coupling point.

U.S. Pat. No. 3,791,674, issued Feb. 12, 1974, discloses a king-pin type coupling assembly for gooseneck trailers The latter reference is pertinent because it discloses generally planar frame plates adapted to be coupled to the bed of a truck, and a central king-pin like post supported above a circular frame element. The coupling element is pivotally displaced between an upwardly projecting operative position for coupling to the gooseneck trailer, and a lower position wherein the king-pin fits into the underside of the truck bed. This type of "retractable" trailer hitch system for gooseneck trailers is also seen in U.S. Pat. No. 4,570,966, Issued Feb. 18, 1986. The latter reference discloses a self contained housing adapted to be installed beneath the truck bed. The housing includes a hydraulic cylinder for projecting a spring biased ball coupling system upwardly through the bed so that it may be selectively deployed when hitching is necessary, and so that it may be retracted to provide a non-interfering surface during normal use of the truck.

U.S. Pat. Nos. 1,272,486, issued July 16, 1918 and 3,893,713, issued July 8, 1975 are representative of trailer hitch devices suitable for use with the goose neck configuration, which "invert" the usual socket and ball relationship. In other words, both of these references teach the use of a ball element secured to the trailer tongue, which is selectively received and captured within suitable jaw like elements normally secured to the truck chassis or frame.

In my experience with trailer hitch assemblies of the type described above and with a wide variety of other coupling devices, certain problems particularly germane to the gooseneck application remain to be resolved. First, because of the rigidity and strength requirements necessary for a safe and secure coupling, the use of pivoted or spring biased "retractable" systems is seriously in question. Internal metal fatigue, rusting and deterioration or damage from misuse can often damage critical internal moving parts. Of course, where systems such as that described in U.S. Pat. No. 3,893,713 are contemplated, the end user is confronted with a device which is unnecessarily expensive and difficult to mount or install. Where certain prior art devices require welding to be installed, current manufacturer warrantees associated with typical pickup trucks may be voided, to the considerable detriment of the owner. Finally, many known trailer hitch devices of the gooseneck variety fail to adequately distribute the load-induced stresses, resulting in twisting, shifting, and deformation of the truck bed.

Thus a quick connect/disconnect gooseneck trailer system of the ball and socket type which properly distributes force, which includes a minimum of parts, and which can be installed without welding and thereafter used without special tools is highly desirable.

SUMMARY OF THE INVENTION

The present invention comprises a fifth wheel ball hitch system particularly adapted for pickup trucks for towing and maneuvering gooseneck trailers. The system is adapted to be mounted by the user directly to the bed of the pickup truck.

In the best mode the system comprises a rigid, force distributing frame which mounts a cooperating, removable ball. The generally planar frame system preferably comprises three separate, cooperating force distributing plates which are welded together. In the best mode the frame system comprises a generally rectangular bed plate which is substantially centered over the wheeled rear axle of the truck, and then bolted directly to the chassis of the truck through the bed without welding. A smaller back-up plate, which is preferably weldably secured at the front of the bed plate, mounts a hammer ball base plate of circular dimensions. The base plate, hammer ball which preferably comprises a rigid, threaded collar member, is welded about its periphery to the back-up plate. This generally circular collar of heat treated carbide steel, includes a threaded orifice for receiving the ball coupling, and initially bears the load stresses. Stresses encountered in towing are non-destructively dissipated through the disclosed frame construction.

The ball coupling comprises a rigid steel ball element which diverges at its lower end in an integral base portion. An elongated, threaded shaft projecting integrally from the ball is adapted to be threadably secured within the threaded collar orifice mentioned above. Importantly, a rigid, hammer flange is weldably secured to the ball system.

The hammer flange includes a central circular portion, from which a pair of outwardly projecting ears emanate. The central hammer flange portion is carefully welded to the ball system base, and it frictionally contacts the similar circular surface of the threaded collar. During installation or removal, the ball system may thus be "hammered." Because of the rigid construction mentioned, the user may install or remove the system by hammering the flange to tighten or untighten the ball element from the collar. When the ball is removed a sealing plug is installed in the collar orifice.

In the best mode the frame members are carefully dimensioned to provide only minimal interference with the planar surface characteristics of the bed when the ball is removed. The bed plate is normally laid directly upon the metal bed of the truck. Where a bed liner is used, the liner will cover the bed plate and the backup plate, and it will be positioned between the back-up plate and the hammer flange when the ball is installed. Thus the instant system may be quickly installed upon a conventional pickup truck bed by the user without welding, and without discarding the preferred plastic bed liner.

Thus a broad object of the present invention is to provide a quick connect-disconnect trailer ball system for gooseneck trailers.

A similar object of the present invention is to provide a "fifth wheel" system for gooseneck trailers which may be quickly and easily deployed between towing and non-towing configurations by the user with a minimum of hand tools.

Yet another object of the present invention is to provide a gooseneck fifth wheel system of the character described which may be quickly, rigidly coupled to pickup truck beds without distorting or bending the truck frame or truck bed, and without welding. It is a feature of the present invention that stresses are distributed about the bed in a mechanically reliable manner.

A similar object is to provide a fifth wheel system of the character described which presents as low a profile as possible, to minimize interference with the truck bed and cargo slidably hauled therewithin.

Another object is to provide a fifth wheel gooseneck trailer hitching system of the character described which is ideally adapted to non-destructively interface with plastic truck bed liners.

Yet another object is to provide a hitching system of the character described which, when installed, will maintain the lowest possible point as center of gravity to increase the efficiency of towing.

Another fundamental object is to provide a fifth wheel gooseneck trailer hitch system of the character described which will not tend to weaken the overall integrity of the towing vehicle or tow bar when properly installed. It is a feature of the present invention that when properly installed, the instant fifth wheel strengthens the truck bed rather than weakening it.

Of course a basic object of the present invention is to provide a fifth wheel gooseneck trailer hitch system of the character described which may be readily fitted to most any pickup truck on the market.

Another important object is to provide a gooseneck trailer hitch system of the character described which may be directly bolted to the frame or carriage of the truck, without welding. It is thus a feature of the present invention that the manufacturer's warrantee associated with new vehicles, for example, would not be voided by installation of the present device.

A fundamental object of the present invention is to provide a quick connect/disconnect ball hitch system for goose neck trailers which can be installed or uninstalled with a single hammer.

Another object is to provide a quick disconnect hammer operated system of the character described which, when uninstalled, leaves the truck bed substantially flat for ease of hauling and use.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE DRAWINGS

Figure 1:
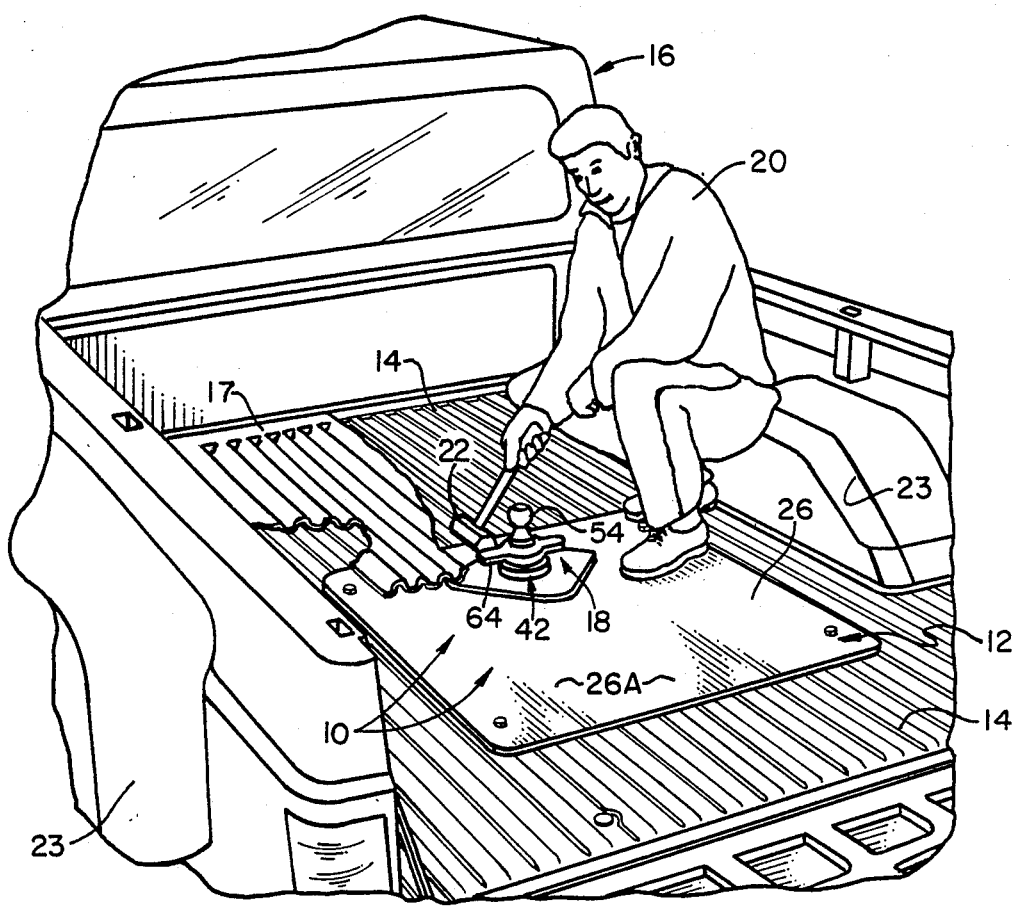
FIG. 1 is a fragmentary, pictorial view illustrating the present fifth wheel gooseneck trailer hitch system properly mounted on a pickup truck bed, with a user illustrated deploying a hammer to remove the ball from the frame.
Figure 2:
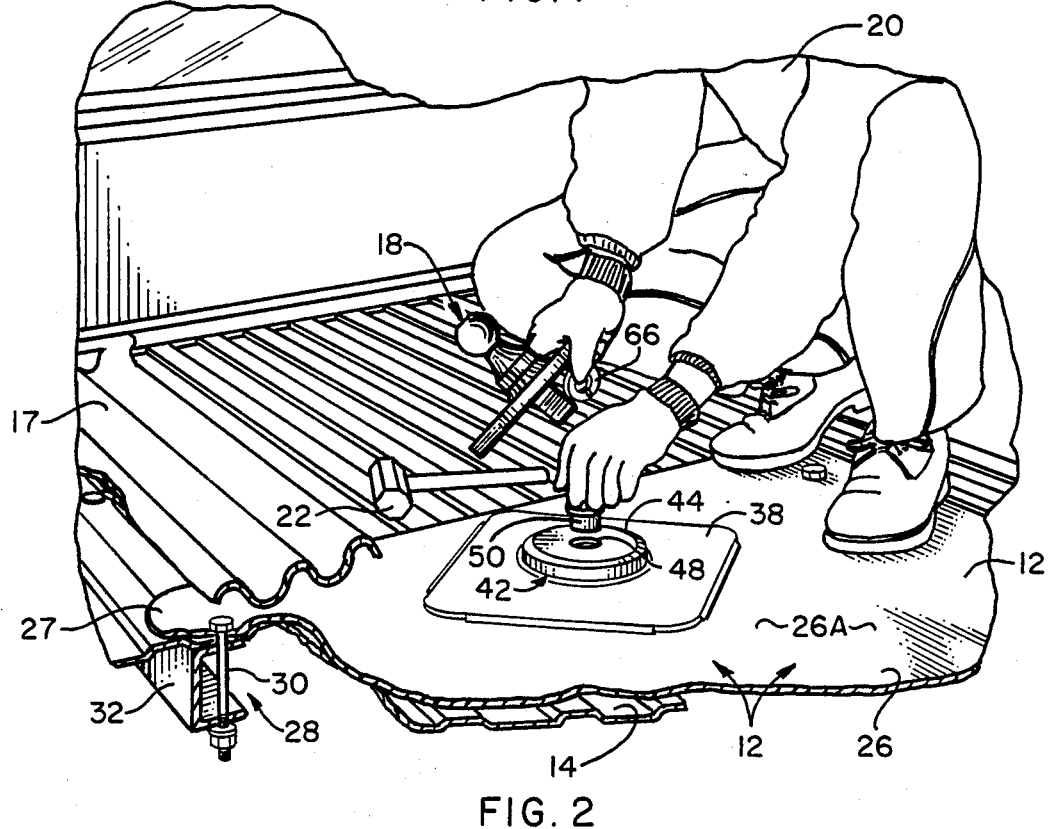
FIG. 2 is an enlarged, fragmentary pictorial view illustrating removal of the ball hitch connector portion from the frame collar, and subsequent installation of a sealing plug.

With initial reference now directed to FIGS. 1 and 2 of the appended drawings, the reference numeral 10 broadly designates a fifth wheel gooseneck trailer ball coupling system constructed in accordance with the best mode of the present invention. As will hereinafter be explained in detail, system 10 comprises a frame, generally indicated by the reference numeral 12, which is adapted to be disposed upon the bed 14 of a conventional pickup truck 16, and a removable ball coupling generally indicated by the reference numeral 18. As will be appreciated from a comparison of FIGS. 1 and 2, once the frame system 12 is appropriately mounted to truck bed 14, the ball coupling system 18 may be installed or uninstalled by user 20 with a simple hand tool such as hammer 22.

Figure 3:
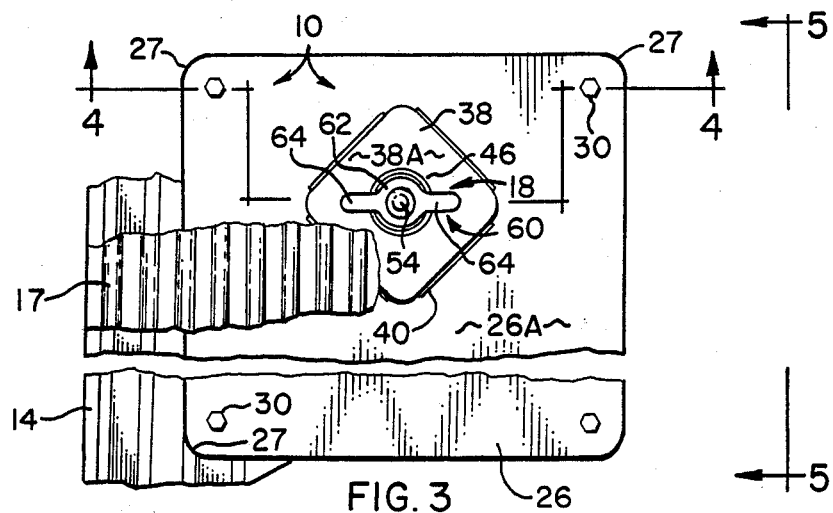
FIG. 3 is an enlarged, fragmentary, top plan view of the installed system, with portions thereof broken away and/or shown in section for clarity.
Figure 4:
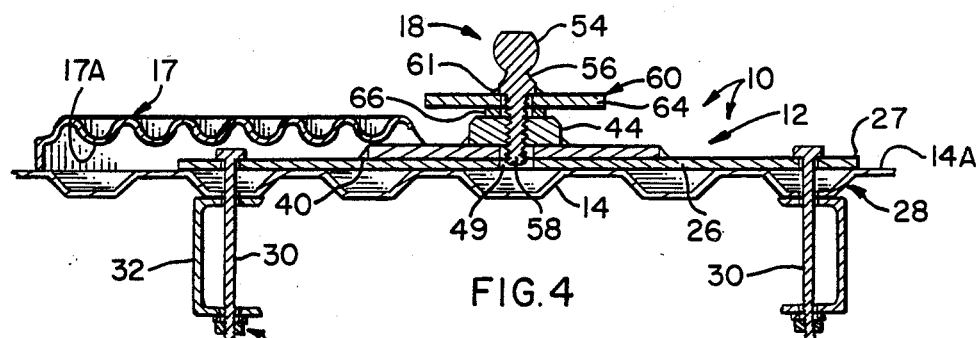
FIG. 4 is an enlarged fragmentary, sectional view of the system taken generally along line 4—4 of FIG. 3.

With additional reference directed now to FIGS. 3-6, system 10 is firmly mounted to the bed 14 of the truck generally between wheel wells 23. In the best mode frame 12 comprises three separate cooperating plates, which dissipate stresses without damaging the truck bed. A rigid bed plate 26 of generally rectangular dimensions is bolted to the truck chassis, generally designated by the reference numeral 28 (FIG. 2). To this effect a plurality of bolts 30, one of which is associated with each corner 27 of the bed plate 26 extend through the truck bed 14 and the chassis frame rails 32, being secured by suitable nut and lock washer combinations 34. As best appreciated from FIGS. 2 and 4, the underside of bed plate 26 rides directly upon the raised, adjacent corrugations of upper surface 14A of truck bed 14. However, where an optional plastic truck liner 17 is employed by user 20, bed plate 26 will be disposed immediately beneath the lowermost liner convolutions 17A (FIG. 4). Bed plate 26 comprises an upper flat outer surface 26A to which the remaining frame parts are weldably secured.

A back-up plate 38 of a generally rectangular or square configuration is carefully welded at the front center of bed plate 26 upon surface 26A. A plurality of spaced-apart beads 40 result at the periphery of back-up plate 38. In the best mode frame 12 also comprises a third frame plate, in the form of an annular apertured hammer ball base plate generally designated by the reference numeral 42. Hammer ball base plate 42 comprises a rigid steel disk-like collar member 44 comprising a beveled upper peripheral edge 45 and a lower edge welded to the surface 38A of back-up plate 38. A generally circular bead 46 thus results.

Figure 6:
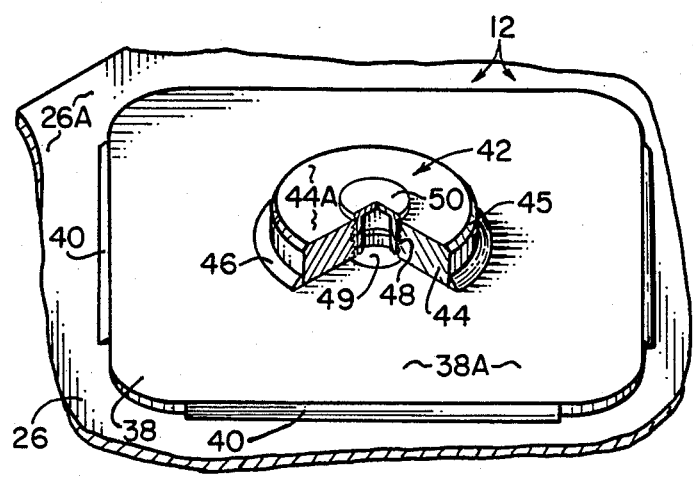

From a comparison of FIGS. 2 and 6 it will be appreciated that the base plate 42 comprises a central orifice 48, which is internally threaded, as revealed in FIG. 6. The base plate orifice 48 is coaxially aligned with an orifice 49 formed through frame 12, extending through both bed plate 26 and back-up plate 38 (FIG. 4). When ball coupling 18 is not to be associated with the frame 12, an optional sealing plug 50 is normally fitted to base plate orifice 48. Of course plug 50 should be removed prior to installation of the ball coupling 18, which will hereinafter be described.

Figure 5:
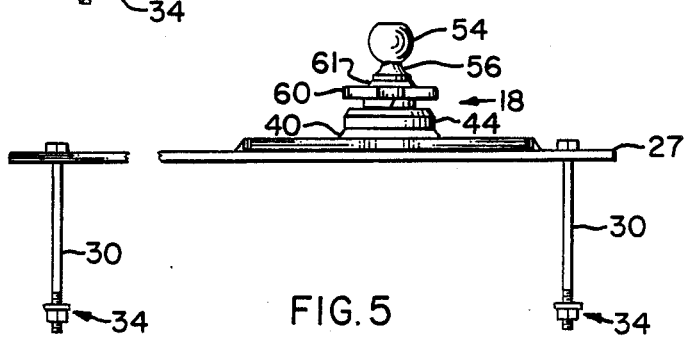
FIG. 5 is an enlarged, fragmentary, right side elevational view taken generally along line 5—5 of FIG. 3, with portions thereof broken away or omitted for clarity; and, FIG. 6 is an enlarged, fragmentary isometric view of the frame system illustrating the bed plate, the backup plate, and the hammer ball base plate, with the optional sealing plug installed.

With particular reference now directed to FIGS. 3-5, the ball assembly generally designated by the reference numeral 18 comprises a rigid spherical ball 54 which is integral with a base portion 56. The base is in the form of a truncated cone and it includes a downwardly projecting threaded shaft 58. A hammer flange generally designated by the reference numeral 60 is welded to base 56 resulting in bead 61 (FIG. 4). Hammer flange 60 preferably comprises a generally circular central segment 62 and a pair of integral, outwardly projecting ears 64. Thus the threaded shaft 58 associated with ball assembly 18 projects downwardly through truck bed 14 through aligned orifices 48, 49 (FIGS. 4, 6) when the ball is installed. It will be threadably received within disk orifice 48, and it may be firmly tightened by using hammer 22 to pound hammer flange ears 64 in the appropriate direction. Prior to installation of the ball assembly it is preferred that a suitable lock washer 66 (FIG. 4) be installed.

It will be noted that as the hammer flange is tightened, its central portion 62 will immediately overlay the upper surface 44A of collar 44 with washer 66 coaxially compressed therebetween. In addition, it will be noted from FIG. 4 that the thickness of truck bed liner 17 is substantially equal to the distance between the upper surface of back-up plate 38 and the installed hammer flange 60. Thus when the ball coupling 18 is suitably threadably coupled to the frame 12, hammer flange 60 will be disposed immediately above the adjacent liner 17 in a readily accessibly and convenient position.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A fifth wheel trailer hitching system adapted to be fitted to a pickup truck for controlling a gooseneck trailer, said system comprising:
   a rigid generally planar frame adapted to be secured to the pickup truck bed, said frame comprising a rigid hammer ball base plate for distributing force, said hammer ball base plate defining a threaded receptor orifice;
   a ball coupling adapted to be selectively attached to said frame and coupled to said gooseneck trailer, said ball coupling comprising:
   a rigid ball having a base;
   a hammer flange rigidly secured to said base, said hammer flange comprising a generally circular central segment welded to said base of said ball and a pair of ears integrally projecting radially outwardly from said central segment; and,
   a rigid threaded shaft projecting from said ball and received within said receptor orifice; and,
   whereby said ball coupling can be threadably secured to or removed from said frame by forcibly striking said flange ears with a hammer or the like.

2. The hitching system as defined in claim 1 wherein said hammer ball base plate comprises a rigid, disk-like collar, and said receptor orifice is coaxially defined in said collar.

3. The hitching system as defined in claim 1 wherein said hammer flange central segment is smaller than said hammer ball base plate.

4. The hitching system as defined in claim 3 wherein said hammer ball base plate is dimensioned such that a pickup truck liner will only be gently contacted by said hammer flange when said ball coupling is threadably installed.

5. The hitching system as defined in claim 4 including a plug adapted to be inserted in said threaded receptor orifice when said ball coupling is removed.

6. A fifth wheel trailer hitching system adapted to be fitted to a pickup truck for controlling a gooseneck trailer, said system comprising:
   a rigid force distributing frame adapted to be secured to the pickup truck bed, said frame comprising a planar bed plate adapted to be centered upon the bed of said pickup truck and bolted to the truck chassis and a rigid, generally rectangular, back-up plate substantially smaller than said bed plate which is welded to said bed plate;
   a ball coupling adapted to be selectively attached to said frame and coupled to said gooseneck trailer, said coupling comprising:
   a rigid ball having a base;
   a hammer flange rigidly secured to said base, said hammer flange comprising a central segment and a pair of ears integrally projecting radially outwardly from said central segment; and, a rigid, threaded shaft projecting from said ball;

a threaded receptor orifice supported by said back-up plate for threadably receiving said shaft to secure said ball coupling; and, whereby said ball coupling can be threadably secured to or removed from said frame by forcibly striking said flange with a hammer or the like.

7. The hitching system as defined in claim 6 wherein said first bed plate directly contacts the metal bed of said pickup truck, said back-up plate is adapted to contact the upper surface of said bed plate and the underside of a pickup truck liner.

8. The hitching system as defined in claim 7, including a plug adapted to be inserted in said threaded receptor orifice when said ball coupling is removed.

9. A gooseneck trailer hitching system for pickup trucks comprising:

a rigid, three piece force distributing frame for mounting to the pickup truck bed, said frame comprising a first, generally rectangular, planar bed plate adapted to be centered upon the bed of said pickup truck and bolted to the truck chassis, a second rigid back-up plate substantially smaller than said bed plate and welded to said bed plate, and a third, hammer ball base plate welded to said back-up plate for further distributing force;

a ball coupling adapted to be selectively attached to said frame and coupled to said gooseneck trailer, said ball coupling comprising:

a rigid ball having a base;

a hammer flange rigidly secured to said base, said hammer flange comprising a central segment welded to the base of said rigid ball and at least one ear integrally projecting radially outwardly from said central segment; and, a rigid, threaded shaft projecting from said ball;

a threaded receptor orifice defined in said third hammer ball base plate for threadably receiving said shaft to secure said ball coupling; and, whereby said ball coupling can be threadably secured to or removed from said frame by forcibly striking said flange with a hammer or the like.

10. The hitching system as defined in claim 9 wherein said hammer ball base plate comprises a rigid, disk-like collar, and said receptor orifice is coaxially defined in said collar.

11. The hitching system as defined in claim 10 wherein said hammer flange central segment is somewhat less in size than said base plate.

12. The hitching system as defined in claim 11 wherein said bed plate directly contacts the metal bed of said pickup truck, said back-up plate contacts the upper surface of said bed plate and the underside of a pickup truck liner, and said base plate is dimensioned such that said liner will only be gently contacted by said hammer flange when said hitch connector is threadably installed.

13. The hitching system as defined in claim 12 including a plug adapted to be inserted in said threaded receptor orifice when said ball coupling is removed.

* * * * *